(12) United States Patent
Hu et al.

(10) Patent No.: US 6,542,635 B1
(45) Date of Patent: Apr. 1, 2003

(54) METHOD FOR DOCUMENT COMPARISON AND CLASSIFICATION USING DOCUMENT IMAGE LAYOUT

(75) Inventors: Jianying Hu, Cranford, NJ (US); Ramanujan S. Kashi, Bridgewater, NJ (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,713

(22) Filed: Sep. 8, 1999

(51) Int. Cl.[7] ............................ G06K 9/34; G06K 9/46; G06K 9/48; G06K 9/62; G06K 9/68
(52) U.S. Cl. ................. 382/173; 382/175; 382/176; 382/177; 382/180; 382/199; 382/202; 382/218; 382/224; 382/225
(58) Field of Search ................. 382/173, 175, 382/176, 177, 180, 199, 202, 203, 218, 224, 225, 226; 707/500, 510, 517, 520, 521, 530

(56) References Cited

U.S. PATENT DOCUMENTS

| | | | | |
|---|---|---|---|---|
| 5,687,253 A | * | 11/1997 | Huttenlocher et al. | 382/177 |
| 5,745,600 A | * | 4/1998 | Chen et al. | 382/218 |
| 5,757,963 A | * | 5/1998 | Ozaki et al. | 382/175 |
| 5,999,664 A | * | 12/1999 | Mahoney et al. | 382/180 |
| 6,249,604 B1 | * | 6/2001 | Huttenlocher et al. | 382/174 |
| 6,356,864 B1 | * | 3/2002 | Foltz et al. | 704/1 |

OTHER PUBLICATIONS

Henry S. Baird, "Background Structure In Document Images", International Journal of Pattern Recognition and Artificial Intelligenc vol. 8 No. 5 (1994) 1013–1030.

Wei Zhu, "Image Organization and Retrieval using a Flexible Shape Model", pp 31–39 1997 IEEE.

Andreas Dengel and Gerhard Barth, "High Level Document Analysis Guided by Geometric Aspects", International Journal of Pattern Recognition and Artificial Intelligence vol. 2 No. 4 (1988) 641–655 (1988).

(List continued on next page.)

Primary Examiner—Phuoc Tran
Assistant Examiner—Amir Alavi (57) ABSTRACT

Document type comparison and classification using layout classification is accomplished by first segmenting a document page into blocks of text and white space. A grid of rows and columns, forming bins, is created on the page to intersect the blocks. Layout information is identified using a unique fixed length interval vector, to represent each row on the segmented document. By computing the Manhattan distance between interval vectors of all rows of two document pages and performing a warping function to determine the row to row correspondence, two documents may be compared by their layout. Furthermore, interval vectors may be grouped into N clusters with a cluster center, defined as the median of the interval vectors of the cluster, replacing each interval vector in its cluster. Using Hidden Markov Models, documents can be compared to document type models comprising rows represented by cluster centers and identified as belonging to one or more document types. In addition, documents stored in a database may be retrieved, deleted, or otherwise managed by type, using their corresponding vector sets without requiring expensive OCR of the document. Furthermore, based on the classification, it is a simple matter to locate which blocks of data contain certain information. Where only that information is desired, it is not necessary to perform OCR on the entire document. Rather OCR may be limited to those blocks where the particular information is expected based on the document type.

14 Claims, 7 Drawing Sheets

OTHER PUBLICATIONS

Hanno Walischewski, "Automatic Knowledge, Acquistion for Spatial Document Interpretation", pp. 243–247 1997 IEEE.

David Doermann, Huiping Li and Omid Kia, "The Detection of Duplicates in Document Image Databases", pp. 314–318, 1997 IEEE.

Jonathan J. Hull and John F. Cullen, "Document Image Similarity and Equivalence Detection", pp. 308–312 1997 IEEE.

R.S. Kashi, J. Hu, W.L. Nelson, "On–line Handwritten Signature Verification using Hidden Markov Model Features".

Douglas E. Critchlow, "Metric Methods for Analyzing Partially Ranked Data," in 34 Lecture Notes in Statistics (D. Brillinger, et al eds. 1985).

Allen Gersho, Robert M. Gray, "Vector Quantization and Signal Compression" (1992).

Lawrence Rabiner, Biing–Hwang Juang, "Fundamentals of Speech Recognition" (1993).

Jianying Hu, Michael K. Brown, and William Turin, "HMM Based On–Line Handwriting Recognition", IEEE Transactions on Patern Analysis and Machine Intelligence, vol. 18, No. 10, Oct. 1996.

John D. Ferguson, "Variable Duration Models for Speech" pp. 143–147.

Hiroaki Sakoe and Seibi Chiba, "Dynamic Programming Algorithm Optimization for Spoken Word Recognition", IEEE Transactions on Acoustics, Speech and Signal Processing vol. ASSP–26, No.1 pp. 43–49 (1978).

Time Warps, String Edits, and Macromolecules: The Theory and Practice of Sequence Comparison (D. Sankoff and J. Kruskal eds. 1983).

William Turin, "Digital Transmission Systems Performance Analysis and Modeling", (McGraw–Hill).

S.E. Levinson, "Continuously variable duration hidden Markov models for automatic speech recognition", Computer Speech and Language pp. 29–45 (1986).

* cited by examiner

PAGE 2(a)   PAGE 2(b)   PAGE 2(c)

METHOD FOR DOCUMENT COMPARISON AND CLASSIFICATION USING DOCUMENT IMAGE LAYOUT

FIELD OF THE INVENTION

The present invention relates generally to document processing. Specifically a new method is taught using document layout data to compare, and/or classify documents by type.

BACKGROUND OF THE INVENTION

In various applications it is desirable to classify documents by their type, e.g., business letter, article, fax cover sheet etc. Obviously, documents can be classified as belonging to any identifiable type. Applications calling for document classification include database management and document routing. Prior art methods of document classification involve three general steps before document types can be identified. First each document is preprocessed, which often includes page segmentation. Page segmentation is the process by which neighboring characters in the document are grouped into blocks of text and white space. Second, one of a variety of known optical character recognition ("OCR") methods is applied to part of, or the entire, document. Finally, keywords are sought out from each document, which reflect the document type from which the words were extracted.

The prior art classification processes are relatively inefficient because they require substantial OCR, which is costly in resources (memory, computational load and time). This is especially true where only a relatively small portion of the document is required to identify its type. Moreover, it may be that the user requires OCR only for a particular document type, yet OCR must be applied to all of the documents in a database to determine the set of documents characterized by the desired type. Accordingly, it would be advantageous to have a method for comparing and classifying document types without requiring OCR.

SUMMARY OF THE INVENTION

In accordance with the present invention, a new method uses document layout information to classify a document type. Documents are first processed with a page segmentation method to obtain blocks of data. A grid of rows and columns, forming bins, is created on the page to intersect the blocks. Layout information is identified using a unique fixed length vector scheme, referred to herein as interval encoding, to represent each row on the segmented document. Using this new vector scheme, documents can be compared using a warping function to compute the relative interval distances of two or more documents. In addition, documents stored in a database may be retrieved, deleted, or otherwise managed by type, using their corresponding vector sets.

Documents may also be classified by type using an extension of the foregoing layout scheme without requiring OCR. In this embodiment are arbitrary number of clusters are formed for grouping interval encoding vectors. Each cluster is identified with a cluster center vector which relates to the interval encoding vectors of that group. A document to be processed in accordance with the present invention, is first, as with document comparison, segmented into data blocks. Interval encoding in accordance with the present invention is then performed on the segmented document. Thereafter, each interval encoding vector in the document is replaced with the cluster center for the cluster to which it belongs.

All desirable document types for classification are modeled based on a Hidden Markov Model ("HMM"). Using known algorithms, new documents are compared with the document type models to classify all documents by the model types.

Furthermore, based on the classification, it is a simple matter to locate which blocks of data contain certain information. Where only that information is desired, it is not necessary to perform OCR on the entire document. Rather OCR may be limited to those blocks where the particular information is expected based on the document type. For example, suppose it was desired to organize all business letters by addressee. A business letter has a predictable format with the addressee information found in the left upper third of the first Page of the document. Once the document is identified by layout to be a business letter, it is an easy matter to then examine only the left upper third of the document to recognize the addressee. There is no need to perform character recognition on the entire document before identifying the addressee.

DETAILED DESCRIPTION OF THE INVENTION

Capturing visual similarity between different document images is a crucial step in many document processing tasks, including document retrieval, understanding and routing. The present invention uses layout classification as an efficient means for a variety of document management tasks, including document image comparison and classification, which can be used directly to answer queries such as "find the document pages with layout similar to this one." Additionally, the present invention can be implemented as the pre-processing steps for some of the more detailed page matching algorithms known in the art. Some of these algorithms are described in J. J. Hull and J. F. Cullen, "Document Image Similarity and Equivalence Detection, in ICDAR '97, pp. 308–12 (1997) and D. Doermann et al., "The detection of Duplicates in Document Image Databases, in ICDAR '97, pp. 314–18 (1997), both of which are hereby incorporated by reference as if fully set forth herein.

Furthermore, layout classification can serve as a fast initial step in document type identification (business letters, scientific papers, etc.), which is useful for both document database management (e.g., business letter might be stored separately from scientific papers), and document routing and understanding (e.g., extracting desirable information from an incoming fax page). For example, if an incoming fax page is classified as a potential business letter, more detailed logical analysis combining geometric features and text cues derived from OCR can then be applied to confirm the hypothesis and assign logical labels to various fields such as sender address, subject, date, etc., which can then be used for routing or content based retrieval and feedback to the user. The advantage of using layout information only in the initial classification is that it is potentially very fast since it does not rely on any OCR results.

Figure 1A:
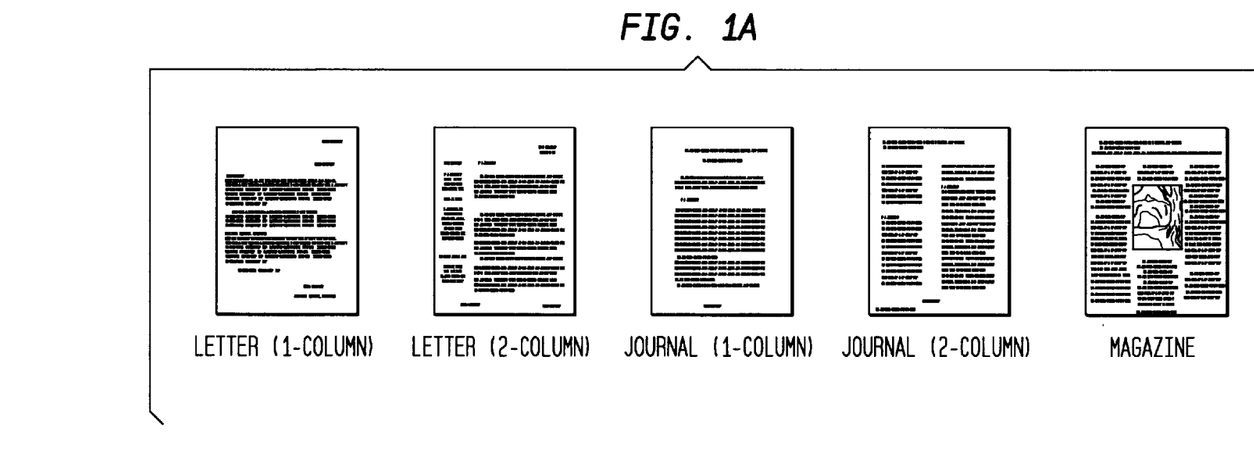
FIG. 1A illustrates the unique and characteristic page layouts of five different document types: letter; letter with margin column, one-column journal, two-column journal and a magazine article.

Referring to FIG. 1A, five page images from different types of printed documents are shown. As is readily apparent from the images, different types of documents often have fairly distinct spatial layout styles. Using document layout types as a classification reference makes it possible to develop fast algorithms for initial document type classification, which can then be verified using more elaborate methods based on more complicated geometric and syntactic models for each particular class. Such elaborate verification methods are known in the art. Some of these methods are described in A. Dengel and G. Barth, "High Level Document Analysis Guided by Geometric Aspects," 2(4) International Journal of Pattern Recognition and Artificial Intelligence, pp. 641–55 (1988) and H. Walischewski, "Automatic Knowledge Acquisition for Spatial Document Interpretation," in ICDAR '97 pp. 243–47 (1997), both of which are hereby incorporated by reference as if fully set forth herein.

Figure 2:
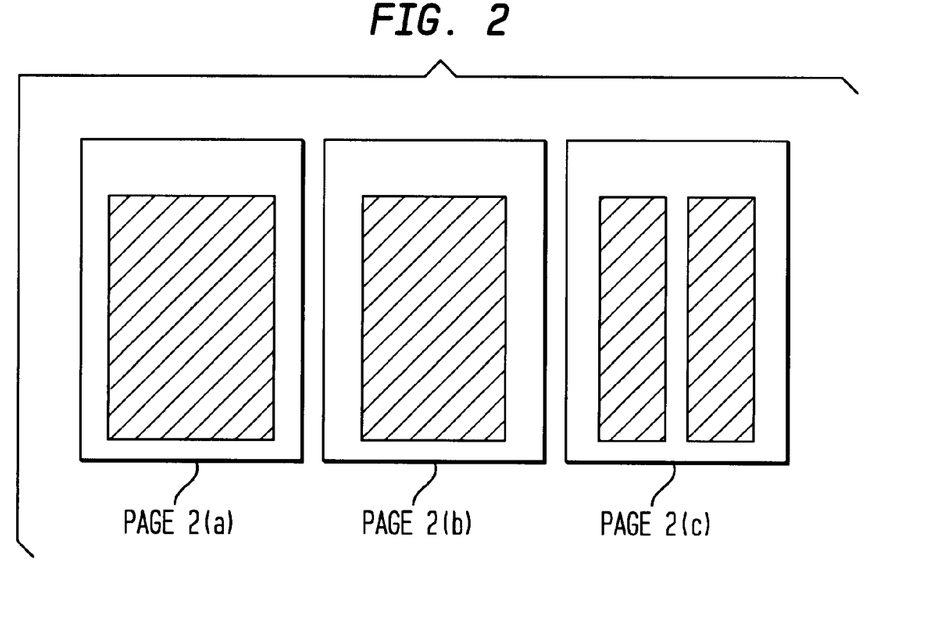
FIG. 2 illustrates three block page layouts for three different document types.

Measuring spatial layout similarity of two documents is in general a difficult task. It requires characterization of similar shapes while allowing for variations originating both from design and from imprecision in the low level segmentation process. As with many pattern recognition problems, there is a trade-off between using high-level and low-level representations in layout comparison. A high-level representation such as the one used in W. Zhu and T. Syeda Mahmood, "Image Organization and Retrieval Using a Flexible Shape Model, in IEEE Int. Workshop on Content Based Access of Image and Video Databases, pp. 31–30 (1998), hereby incorporated by reference as if fully set forth herein, provides a better characterization of the image, but is less resilient to low-level processing errors (split or merged blocks are fairly common, especially under noisy conditions) and generally requires a more complicated distance. computation. On the other hand, a low level representation, such as a bit map, is very robust and easy to compute, but does not capture the inherent structures in an image. For example, FIG. 2 illustrates the different layout structures for three simple pages. Pages 2(*a*) and 2(*b*) both have one-column layout, with slightly different dimensions. Page 2(*c*) has a two-column layout. Clearly pages 2(*a*) and 2(*b*) are more similar in a visual sense than pages 2(*a*) and 2(*c*). However, a direct comparison of their bit-map will yield similar distances in both cases.

In accordance with the present invention a novel spatial layout representation called interval encoding encodes regional layout information in fixed-length vectors, thus capturing structural characteristics of the image while maintaining flexibility. These fixed-length vectors can be compared to each other through a simple distance computation, i.e. the Manhattan distance, as described in more detail below. Furthermore, these vectors can be clustered and used in a trainable statistical classifier for document type classification.

The following description of the present invention will focus on the first page of a document. Generally, it will be sufficient to perform the operations of the present invention on the first page of each document, as that will be most representative of the document type. However, should a particular document require analysis of additional pages, it will be understood that the principles of the present invention remain the same.

Figure 3:
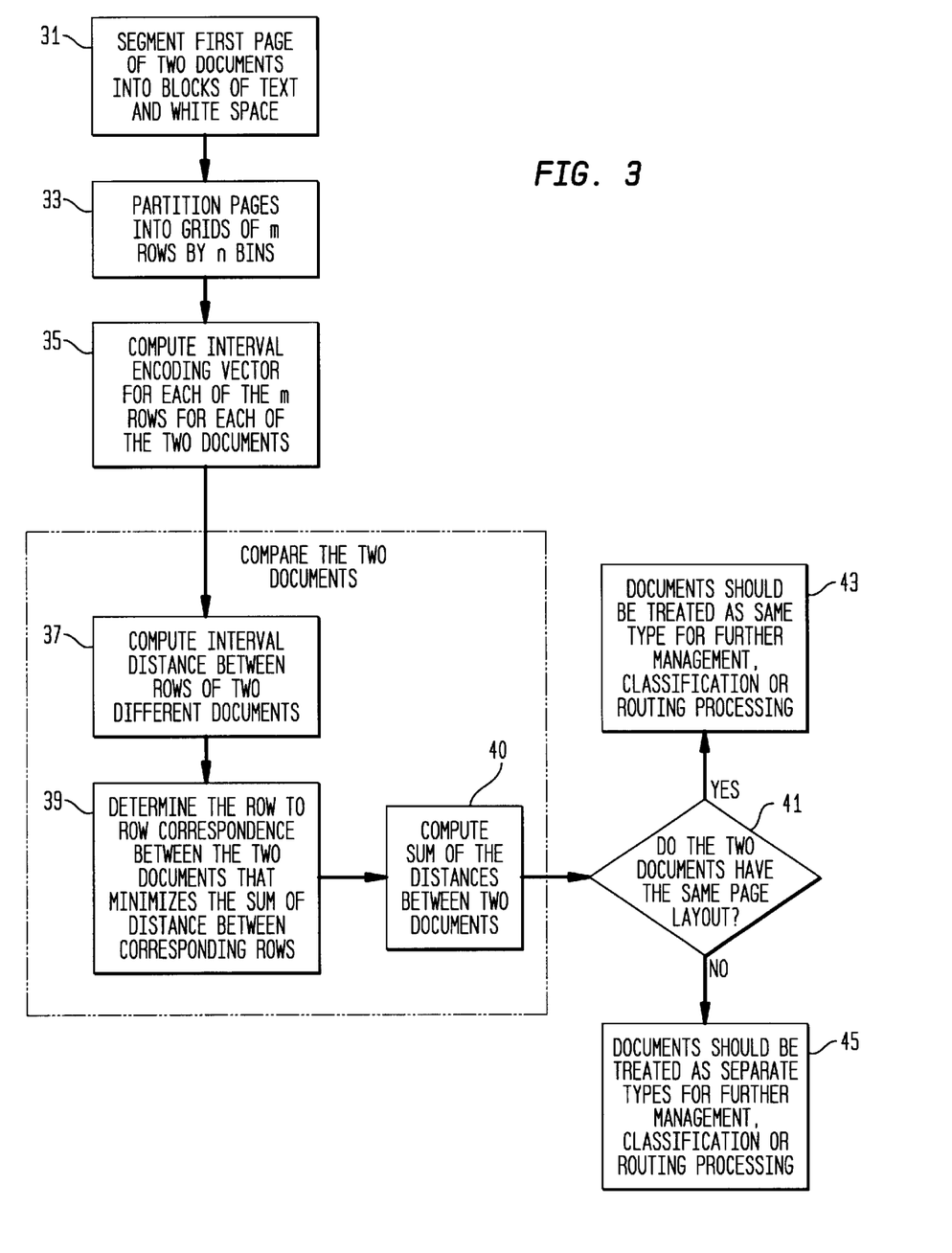
FIG. 3 is a flow chart of one embodiment of the document comparison of the present invention using interval distances.

FIG. 3 is a is a flow chart of one embodiment of the document comparison of the present invention using interval distances. Referring to the flow chart of FIG. 3, the first step in all applications of the present invention, whether document comparison, or classification, is to segment the subject document into rectangular blocks of text with white space acting as a generic layout delimiter, block 31.

Figure 1B:
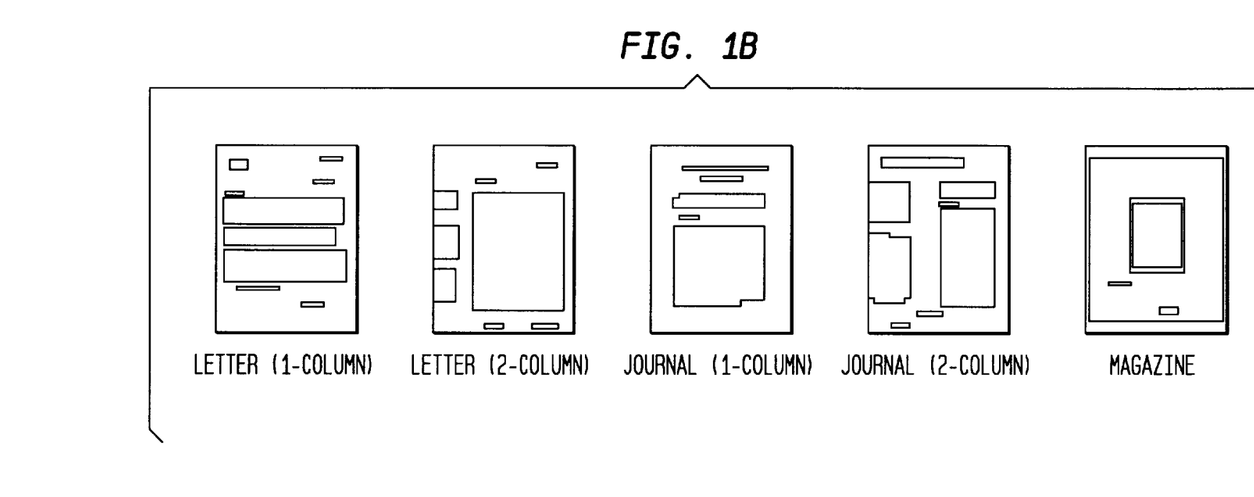
FIG. 1B illustrates the block layout result of the five document types of FIG. 1A, after page segmentation.

It should be noted that certain page segmentation schemes might be more appropriate for documents with text only, while others may work better for documents, which include pictures. The block segmentations for the documents in FIG. 1A, are shown in FIG. 1B.

Figure 4:
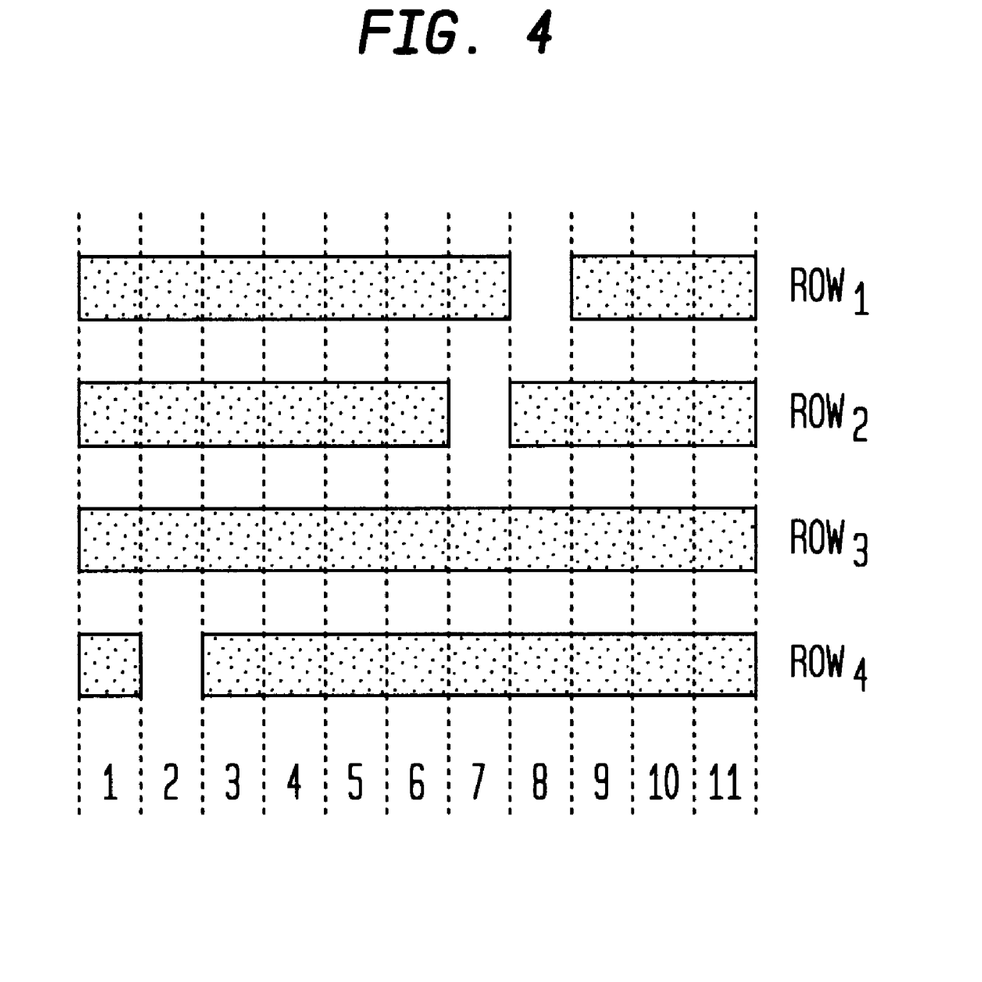
FIG. 4 illustrates a grid intersecting several blocks of text and white space, where the grid is formed of four rows divided into 11 bins each.

Next, moving to block 33, the segmented document image is partitioned into an m (rows) by n (bins) grid; each cell of the resulting grid referred to herein as a bin. A bin is defined to be a text bin if at least half of its area overlaps a single text block. Otherwise it is a white space bin, The number of rows and bins should in general be selected so as to capture the detail of the page structure. Thus the bins should be smaller than the narrowest blocks. A general rule of thumb, although in no way intended to be limiting, is to divide each 8.5 in. by 11 in. page into 20–50 bins per row and 50 to 100 rows per page. FIG. 4 illustrates a grid comprising 11 bins and 4 rows. For purposes of the following discussion, the $i_{th}$ row is denoted as $r_i$. The bins in each row are labeled 1 through n, from left to right.

Using the m by n grid of the page layout a novel interval encoding scheme, described in detail below, is used to compare two such page layouts. It should be noted that the comparison steps are necessary for document comparison, as well as classification. The layout comparison is comprised of two general steps: first, a distance is computed between one row on one document page with another row on the other document page, block 37; and second, rows of the two documents are matched such that the sum of distances between corresponding rows of the two documents is minimized, block 39.

The distance between two rows can be computed in numerous ways. In a general sense any method used to compare two page layouts such that two documents may be compared and/or classified by layout without requiring OCR, falls within the scope of the present invention. However, one novel method of interval encoding using the Manhattan distance between two rows of two documents has been found particularly advantageous when compared with other methods. The following embodiment of the present invention, using interval encoding thus represents a particularly advantageous embodiment of the present invention.

The process of interval encoding begins by representing each row of a document page as a fixed length vector, block 35; the length being the number of bins, n. Thus the vector of one row of a page on a first document may be represented as $x_1 \ldots x_n$, and the vector of a row of a page on a second document may be represented as $y_1 \ldots y_n$. The value of x or y of a particular bin is the distance of that bin from the left most or right most border of the text block in which the bin is found, whichever value is smaller. The Manhattan distance then between these two rows is given by the sum of $|x_i - y_i|$ over all bins 1 through n.

As an example consider the four rows, 11 bins of FIG. 4. The interval vector E of each of the four rows is given by:
E(row 1)=(1,2,3,4,3,2,1,0,1,2,1);
E(row2)=(1,2,3,3,2,1,0,1,2,2,1);
E(row3)=(1,2,3,4,5,6,5,4,3.2.1); and
E(row4)=(1,0,1,2,3,4,5,4,3,2,1).
The Manhattan distance between rows 1 and 2, $l_{1,2}$, is simply $|(1-1)|+|(2-2)|+|(3-3)|+|(4-3)|+|(3-2)|+|(2-1)|+|(1-0)|+|(0-1)|+|(1-2)|+|(2-2)|+|(1-1)|=6$. The Manhattan distance of two interval vectors will be referred to herein as the interval distance.

To illustrate the usefulness of the interval encoding described above, we may compare it with a simple binary distance. While binary distance may be used in accordance with the present invention, it will be clear that often times the result will not be as good as that obtained with the novel interval encoding and interval distance described above. With binary distance, we take the Manhattan distance between two rows where each row is encoded by setting a bin to be 1 if it is a text bin and 0 otherwise (or vice versa). While it is simple, it fails to capture the notion of similarity between rows due to similar block intersection patterns.

This notion of similarity is better captured by interval distance, than by the Manhattan distance between binary representations. For example, consider the binary vectors B of the rows shown in FIG. 4, in contrast to the interval encoding vectors E of the same four rows, as described above:
E(row 1)=(1,2,3,4,3,2,1,0,1,2,1) B(row1)=(1,1,1,1,1,1,1,0,1,1,1)
E(row2)=(1,2,3,3,2,1,0,1,2,2,1) B(row2)=(1,1,1,1,1,1,0,1,1,1,1)
E(row3)=(1,2,3,4,5,6,5,4,3,2,1) B(row3)=(1,1,1,1,1,1,1,1,1,1,1)
E(row4)=(1,0,1,2,3,4,5,4,3,2,1) B(row4)=(1,0,1,1,1,1,1,1,1,1,1).

Using the interval distance it is clear that row1 is more similar to row2 than either is to row3 since $d^I$ (row1, row2)=6, $d^I$ (row1, row3)=16 and $d^I$ (row2, row3)=18. However, using the Manhattan distance between binary representations, $d^M$, gives that $d^M$ (row1, row2)=2 whereas $d^M$ (row1, row3)=$d^M$ (row2, row3)=1.

Similarly, although row1, row2 and row4 all intersect exactly two blocks, row1 and row2 are more similar to each other than either is to row4 since they intersect blocks at similar horizontal positions whereas the blocks that row4 intersects have much different horizontal positions. Again, the interval distance agrees with this sense of similarity since $d^I$ (row1, row4)=18>$d^I$ (row2, row4)=17>$d^I$ (row1, row2)=6. However, using binary distance, row1, row2 and row4 are each at distance 2 from one another.

Another known distance measure that may be used with the method of the present invention is the edit distance, described in "Time Warps, String Edits and Macromolecules: The Theory and Practice of Sequence Comparison" (J. B. Kruskal and D. Sankoff eds. 1983), hereby incorporated by reference as if fully set forth herein. With the edit distance each row is described as a sequence of block records, each record indicating the start and end of the block. The edit distance is measured by computing the cost of adding, deleting and substituting block records so as to make the two sequences identical. In the present application the cost of adding or deleting a block is defined as f−s+1, where f is the last (rightmost) bin in the block and s is the first (leftmost) bin in the block. The cost of substituting a block with end pair s and f, with another block having end pair u and v is $|s-u|+|f-v|$. While the edit distance appears to be the measure that most accurately captures the differences between rows, it can be computationally unattractive if the lengths of the rows become too large.

As described further below in connection with the classification embodiment of the present invention, cluster centers are computed and each vector representing a row is replaced with the cluster center of the cluster it belongs to. The cluster center is a block sequence R that minimizes the sum of the distances from R to each of the block sequences in the cluster. When using edit distance, the cluster center might not be easily computed.

Having represented each row on a page with a fixed length interval vector, the next step is to be able to compare two pages, each comprising a set of interval vectors. In order to capture the visual similarity between document images, a dynamic programming algorithm is used to match rows from one document page to the other. The objective is to align the rows of the two document pages so as to minimize the sum of the interval distance between corresponding rows on the two document pages. This process is often referred to as warping.

One advantageous warping function is described in H. Sakoe and S. Chiba, "Dynamic Programming Algorithm Optimization for Spoken Word Recognition," IEEE Trans. Acoust., Speech, Signal Processing (1978), hereby incorporated by reference as if fully set forth herein.

Having identified the row to row correspondence between two pages of two documents, the document pages may be compared to determine if they are similar. This is computed by computing the sum of the distances between two corresponding rows, for all the rows of the two document pages, block 40. The designer of the particular system implementing the present invention will select a threshold that will dictate whether two documents are of the same type. Clearly, while two fax cover sheets are of the same type and information may be organized on the page in a similar fashion, they will not necessarily have a one to one correspondence between text blocks. The message on one may be longer than that on the other. One fax may be addressed to one individual, while the other may be addressed to multiple recipients. Thus a threshold must be set to define the degree of similarity that will be required so as to consider two documents to be of the same type.

The determination of whether two documents are sufficiently similar so as to be considered of the same type is shown in block 41. If they are similar they may be classified as the same type, block 43. Otherwise, they may be classified as two different document types, block 45. Having identified the document type without OCR, it is possible to further process the documents in a variety of different ways, including: document management, classification, routing, or information retrieval.

Figure 5:
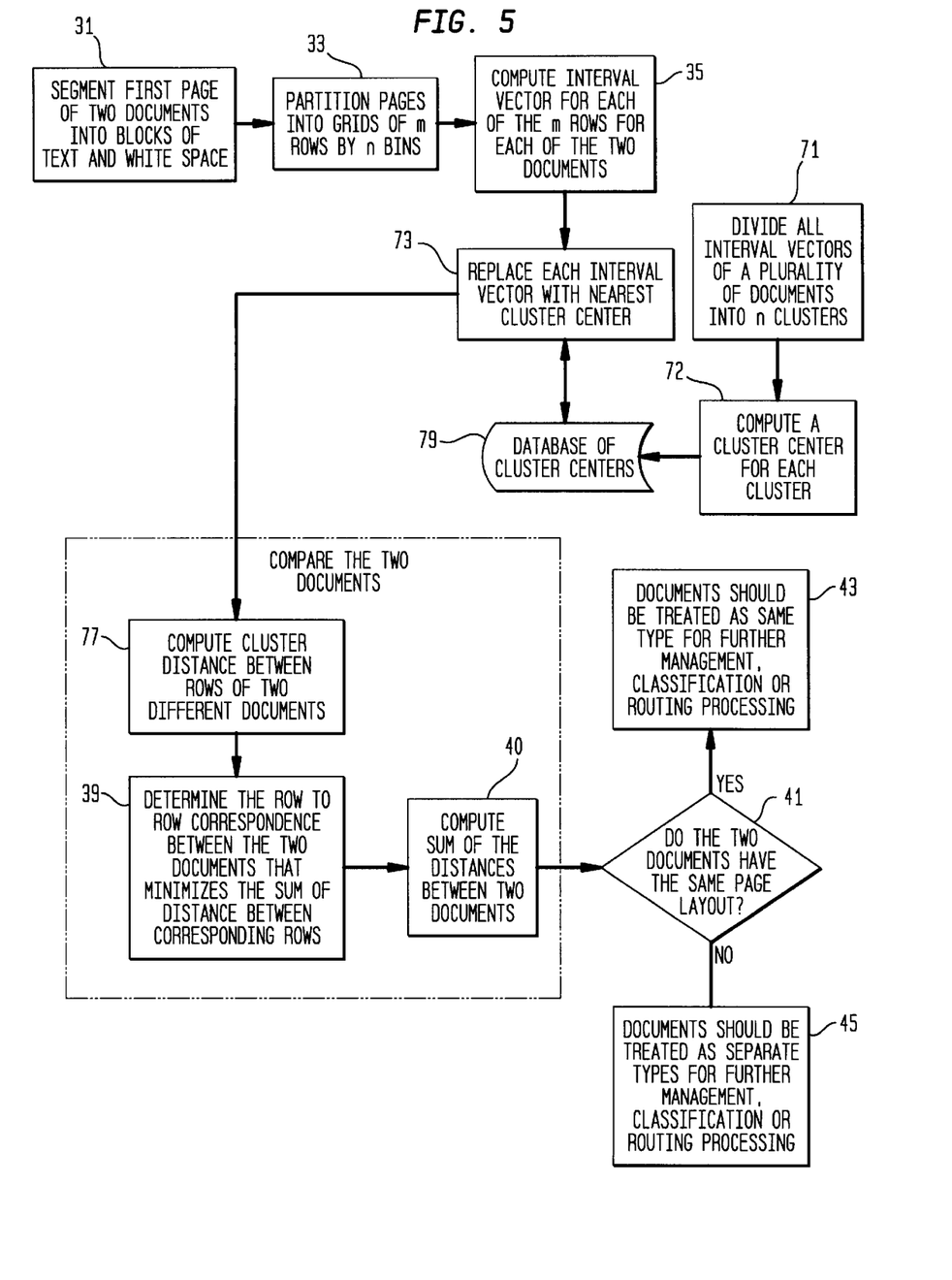
FIG. 5 is a flow chart of a second embodiment of the document comparison of the present invention using cluster distances.

FIG. 5 is a is a flow chart of a second embodiment of the document comparison of the present invention using cluster distances. As mentioned above, another advantageous embodiment of the present invention, beyond document comparison, is document classification. In accordance with the present invention and referring to FIG. 5, document classification is performed through layout comparison, without any OCR. Given a collection of interval vectors of length n, clusters of vectors are identified, block 71. For each cluster of interval vectors, a cluster center vector is computed, block 72. These cluster centers may be stored in database 79 for later retrieval.

The cluster center is defined as the vector whose distance to all constituent vectors is minimal. In other words the median vector of all constituent vectors, where the Manhattan distance is used, or the average vector where Euclidean distance is used. Thus in the case of a cluster of interval vectors, and using the Manhattan distance, the cluster center would be the median of all the interval vectors, which may or may not correspond to an actual interval vector in the cluster.

Given a document for classification, the interval vectors for the page are computed. Thereafter, each interval vector is replaced with the cluster center vector for the cluster to which the interval vector is nearest. In one preferred embodiment the interval vector is replaced with a simple reference pointer to a cluster center. For purposes of the present invention, the Manhattan distance may be advantageously used to measure the distances between interval vectors and cluster centers.

It should be noted that once interval vectors are classified into clusters, it becomes possible to measure the distance between two rows based on the distance between the cluster centers nearest to the vectors representing the respective rows. This cluster distance can be denoted as $d^c(r_i, r_j)$, representing the distance between interval vectors $r_i$ and $r_j$ by computing the Manhattan distance between the cluster centers closest to each of $r_i$ and $r_j$. Thus it is possible to reduce a sequence of interval vectors to n clusters by replacing every interval vector with its nearest cluster center, block 73. Thereafter, the warping function as described above can be used to identify a row to row correspondence between two document pages using the cluster center vector in lieu of the interval vector for each row, blocks 77 and 39.

Clusters can be identified through a variety of known methods, including advantageously, the k-means clustering technique, described in A. Gersho and R. M. Gray, "Vector Quantization and Signal Compression" (Kluwer Academic Publ. 1992), hereby incorporated by reference as if fully set forth herein.

At this point the document represented by a series of cluster center vectors, must be compared with the possible document types to which it can be classified. In a simple instance there may be a document type which is characterized by the exact sequence of cluster center vectors as represents the document. However, it is more likely that even with using cluster vectors to represent each row on a page, there may still be variations within a document type as to which cluster vectors will appear, the sequence of cluster vectors and the frequency with which they appear, on a given page. Thus it may be advantageous to model each document type so that a given document page can be compared with the model. Accordingly, one advantageous embodiment of the present invention models each document type using the Hidden Markov Model ("HMM"). Training and classification of the models can be accomplished using known algorithms, such as is described in L. R. Rabiner and B. H. Juang, "Fundamentals of Speech Recognition" (Prentice Hall 1993), hereby incorporated by reference as if fully set forth herein. See also, J. Hu et al., "HMM Based On-Line Handwriting Recognition, hereby incorporated by reference as if fully set forth herein.

Since a particular layout type is advantageously characterized as a sequence of vertical regions, each region having more or less consistent horizontal layout features (i.e., number of columns and widths and position of each column) and a variable height, a top-to-bottom sequential HMM is used. The observations of the model are the interval vectors described above, and the states correspond to the vertical regions. Because of the probabilistic nature of the HMM, they are robust to noise and thus are well suited to handle the inevitable inconsistencies in low-level page segmentation (e.g., vertical splitting or merging of blocks).

Figure 6:
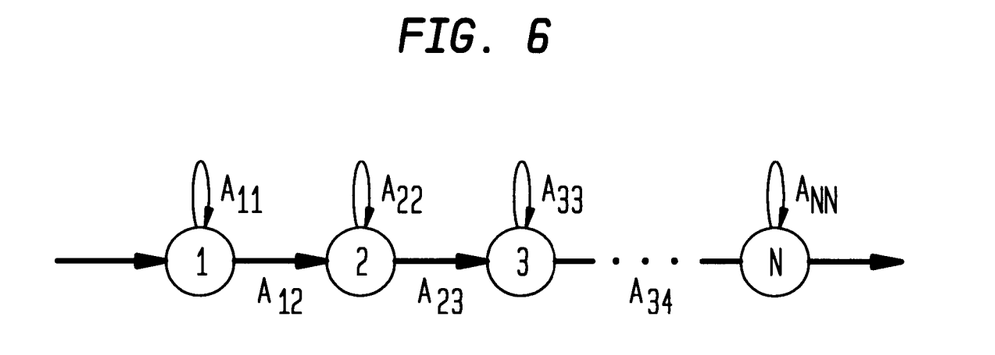
FIG. 6 illustrates a top to bottom Hidden Markov Model state-transition diagram.

Referring to FIG. 6, the state transition diagram of a top-to-bottom sequential HMM is shown, albeit, drawn left to right for convenience. The N states, each reflecting a different vertical region of a document page, where N is the maximum number of regions for all document types. It should be noted that advantageously the number of vertical regions will vary from document type to document type. The model also has M distinct observations, where each observation corresponds to a different interval vector, or cluster center. It may be advantageous to use cluster centers, as there will likely be fewer cluster centers than interval vectors. When using cluster centers, M will correspond to the number of clusters, which roughly represents the number of distinct horizontal layout patterns seen in the training set. In a preferred embodiment the model uses unique reference pointers to cluster centers in lieu of both interval vectors and cluster centers.

As can be seen from FIG. 6, an observation, or cluster vector at state 1 could mean that the row represented by that observation is from the next vertical region, or state 2. This is shown by $a_{12}$. Alternatively, the cluster vector could be part of the same vertical region, or state 1. This is shown by $a_{11}$. Similarly, there are two possibilities for each of the N states.

Typically with HMMs, state duration (state-holding time) distribution is implicitly described in exponential form. In other words the probability that an observation, i.e. cluster vector, belong to the same state as the previous cluster vector, decreases exponentially with each subsequent observation. This distribution is inappropriate however, for modeling page layout since each vertical region of the page may assume a range of possible lengths with similar probabilities.

More flexibility may be available with explicit duration modeling, as described in connection with speech recognition and signature verification in J. D. Ferguson, "Variable Duration Models for Speech," in Proc. Symp. On the Application of HMM to Text and Speech pp. 143–79 (1980); S. E. Levinson, "Continuously Variable Duration Hidden Markov Models for Automatic Speech Recognition," Computer Speech and Languager, 1(1):29≧45 (1986); and R. Kashi et al., "On-Line Handwriting Signature Verification Using Hidden Markov Model Features," in Proc. ICDAR '97 (1997), all of which are hereby incorporated by reference as if fully set forth herein. This results in a variable-duration HMM, also known as a Hidden Semi-Markov Model (HSMM), because the underlying process is a semi-Markov process, as described in W. Turin, "Performance Analysis of Digital Transmission Systems," (1990), hereby incorporated by reference as if fully set forth herein.

With explicit duration modeling the state-duration distribution can be a general discrete probability distribution and there is no need to estimate state transitional probabilities. The downside of allowing the state duration to be any general distribution is that it has more parameters and thus requires more training samples for a reliable estimation, than the exponential form. To alleviate this problem, a simplifying constraint may be imposed on the distribution such that it can only assume a rectangular shape. Under this constraint, the duration boundaries $\tau_1$ and $T_f$, where $\tau_f < T_1$, are estimated for each state during training.

$\tau_1$ represents the smallest number of rows in a region found within the training samples and $T_1$ represents the maximum number of rows found in a single region within the training sample. While the training sample may be a good indicator of the size of regions that may be found in application, they are only approximate boundaries and the uncertainty must be accounted for. Clearly, the more confidence one has in the training sample then the less compensation required and vice versa. Accordingly, the probability that the state duration will be less than $\tau_I$ or greater than $T_I$ is represented by a small constant $\delta$, while the probability that the duration of a particular state i is within $\tau_1$ and $T_I$ is measured as $(1-\delta)/(T_I-\tau_I+1)$. This last ratio may range from a lower limit of 2, since 1 would indicate no training was done, to a boundless upper limit for extreme confidence in the training sample. In practice, high confidence is shown where $\delta$ is selected such that $(1-\delta)/(T_I-\tau_I+1)$ is $10\delta$ or more.

The Viterbi algorithm may advantageously be used for both training and classification, which can easily accommodate explicit duration modeling without much extra computation. The Viterbi algorithm searches for the most likely state sequence corresponding to the given observation sequence and gives the accumulated likelihood score along this best path. It should be noted that with explicit duration modeling the Viterbi algorithm will not necessarily guarantee the optimal state sequence, because now the accumulated score of a sequence leading to state i not only depends on the previous state, but also on how the previous state was reached (history reflected in the duration d).

Figure 7:
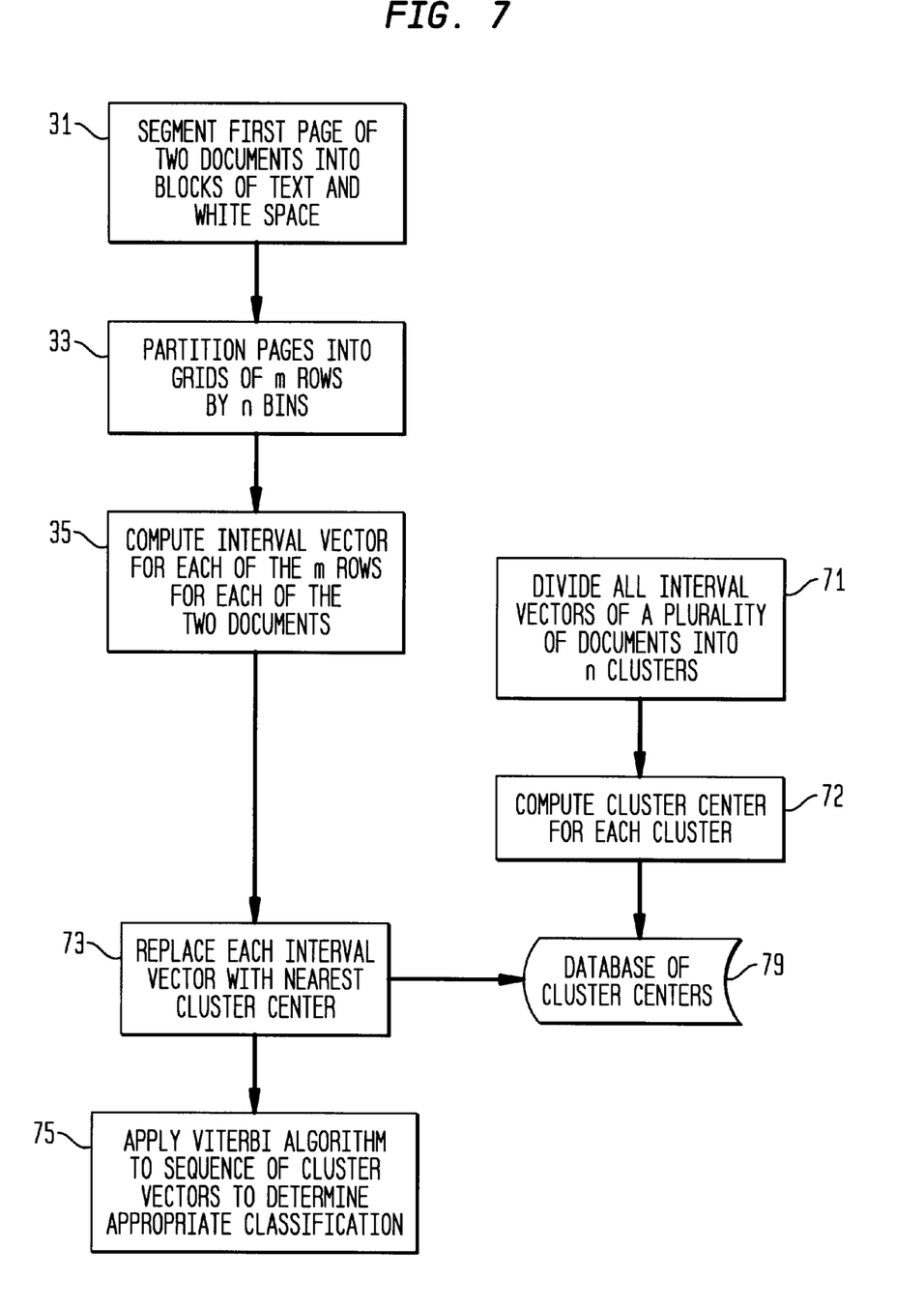
FIG. 7 is a flow chart of a third embodiment of the document comparison of the present invention using a Viterbi algorithm.

FIG. 7 is a flow chart of a third embodiment of the document comparison of the present invention using a Viterbi algorithm. Referring to FIG. 7, during classification, first preprocessing and feature extraction are carried out and the observation sequence is computed for a given page as shown in FIG. 5, blocks 31, 33, 35, 71–73 and 79. Then the Viterbi algorithm is applied in block 75 to find the likelihood of the observation sequence being generated by each one of the K class models. The page is then labeled as a member of the class with highest likelihood score. Alternatively, more than one class with highest likelihood score can be retained as potential class labels to be examined more carefully later on.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for comparing two document images, said method comprising the steps of:
   segmenting a page of each of said documents into at least one text block;
   determining, for each of said segmented pages of said documents, the layout of data for each of said documents;
   comparing said layouts of said documents to determine the degree of similarity between said documents;
   partitioning said segmented pages into a grid of m rows, each of said m rows comprising n bins;
   computing a fixed length vector of each of said m rows;
   assigning each of said fixed length vectors of each of said documents with a corresponding one of a plurality of clusters, each of said clusters having a cluster center vector, said corresponding cluster to one of said fixed length vector being a cluster whose cluster center vector is the nearest to said fixed length vector; and
   replacing each of said fixed length vectors of a document in each of the respective clusters with an indication of that cluster.

2. The method of claim 1 wherein said fixed length vector is an interval encoding of said row of bins.

3. The method of claim 2 wherein said comparing step further comprises the steps of:
   determining a row to row correspondence between said segmented pages of said documents, which minimizes the sum of the distances between the vectors of the corresponding rows of said segmented documents;
   computing the sum of the distances between the interval vectors of corresponding rows of said pages of said documents.

4. The method of claim 3 wherein said determining a row to row correspondence includes performing a warping function on said interval vectors.

5. The method of claim 1 wherein said indication of that cluster is the cluster center vector of that cluster.

6. The method of claim 1 wherein said indication of that cluster is a pointer to a memory location in which said cluster center vector is stored.

7. The method of claim 1 wherein said comparing step further comprises the steps of:
   determining a row to row correspondence between said segmented pages of said documents, which minimizes the sum of the distances between the cluster center vectors of the corresponding rows of said segmented documents;
   computing the sum of the distances between the cluster center vectors of corresponding rows of said pages of said documents.

8. A method for classifying a document image in one of a plurality of document types, said method comprising the steps of:
   segmenting a page of said document into at least one text block;
   determining for said segmented page of said document, the layout of data for said document;
   partitioning said segmented page into a grid of m rows, each of said m rows comprising n bins;
   computing a fixed length vector of each of said m rows; and
   classifying said document with other documents having a similar layout by assigning said fixed length vectors of said document with a corresponding one of a plurality of clusters, each of said clusters having a cluster center vector, said corresponding cluster to each of said fixed length vectors being a cluster whose cluster center vector is nearest to said fixed length vector, and by replacing each of said fixed length vectors of said document in each of the respective clusters with an indication of its corresponding cluster.

9. The method of claim 8 wherein said indication of its corresponding cluster is a pointer to a memory location in which said cluster center vector is stored.

10. The method of claim 8 wherein said indication of its corresponding cluster is said cluster center vector of said corresponding cluster.

11. The method of claim 8 further comprising the step of identifying from said cluster center vectors of said page the document type of said document page.

12. The method of claim 11 wherein said document type of said document page is identified by application of a Viterbi algorithm on said sequence of cluster center vectors.

13. A computer system for comparing the digital images of two documents, comprising:
   computer implemented software means for segmenting a page of each of said documents into at least one text block;
   computer implemented software means for determining, for each of said segmented pages of said documents the layout of data for each of said documents;

computer implemented software means for comparing said layouts of said documents to determine the degree of similarity between said documents;

computer implemented software means for partitioning said segmented page into a grid of m rows, each of said m rows comprising n bins;

computer implemented software means for computing a fixed length vector of each of said m rows;

computer implemented software means for assigning said fixed length vectors of said document with a corresponding one of a plurality of clusters, each of said clusters having a cluster center vector, said corresponding cluster to each of said fixed length vectors being a cluster whose cluster center vector is nearest to said fixed length vector; and computer implemented software means for replacing each of said fixed length vectors of said document in each of the respective clusters with an indication of its corresponding cluster.

14. A computer implemented system for classifying a digital image of a document into one of a plurality of document types, comprising:

computer implemented software means for segmenting a page of said document into at least one text block;

computer implemented software means for determining for said segmented page of said document, the layout of data for said document;

computer implemented software means for partitioning said segmented page into a grid of m rows, each of said m rows comprising n bins;

computer implemented software means for computing a fixed length vector of each of said m rows; and computer implemented software means for classifying said document with other documents having a similar layout by assigning said fixed length vectors of said document with a corresponding one of a plurality of clusters, each of said clusters having a cluster center vector, said corresponding cluster to each of said fixed length vectors being a cluster whose cluster center vector is nearest to said fixed length vector, and by replacing each of said fixed length vectors of said document in each of the respective clusters with an indication of its corresponding cluster.

* * * * *